(12) United States Patent
Shoup et al.

(10) Patent No.: US 12,418,806 B2
(45) Date of Patent: Sep. 16, 2025

(54) METHOD TO IMPROVE PERFORMANCE OF A WIRELESS DATA CONNECTION

(71) Applicant: AIRBRIJ Technology Inc., Reno, NV (US)

(72) Inventors: David Loren Shoup, Huntington Beach, CA (US); Darren Warner, Vancouver, WA (US)

(73) Assignee: AIRBRIJ TECHNOLOGY INC., Reno, NV (US)

( * ) Notice: Subject to any disclaimer, the term of this patent is extended or adjusted under 35 U.S.C. 154(b) by 617 days.

(21) Appl. No.: 17/573,276

(22) Filed: Jan. 11, 2022

(65) Prior Publication Data

US 2022/0256362 A1  Aug. 11, 2022

Related U.S. Application Data

(60) Provisional application No. 63/136,032, filed on Jan. 11, 2021.

(51) Int. Cl.
*H04W 24/02* (2009.01)
*H04W 28/06* (2009.01)
*H04W 28/22* (2009.01)
*H04W 28/24* (2009.01)
*H04W 76/15* (2018.01)

(52) U.S. Cl.
CPC ........... *H04W 24/02* (2013.01); *H04W 28/06* (2013.01); *H04W 28/22* (2013.01); *H04W 28/24* (2013.01); *H04W 76/15* (2018.02)

(58) Field of Classification Search
CPC ..... H04W 24/02; H04W 76/15; H04W 28/06; H04W 28/22; H04W 28/24
See application file for complete search history.

(56) References Cited

U.S. PATENT DOCUMENTS

| 11,018,957 B1* | 5/2021 | Ezra | G06F 9/5072 |
| 2004/0158705 A1* | 8/2004 | Burdett | |
| 2014/0052825 A1* | 2/2014 | Luecke | H04L 67/61 |
| | | | 709/219 |
| 2014/0165165 A1* | 6/2014 | Story, Jr. | |
| 2017/0257439 A1* | 9/2017 | Wang | |
| 2020/0067828 A1* | 2/2020 | Liu | H04L 43/0882 |
| 2020/0072623 A1* | 3/2020 | Sunil Kumar | G01C 21/3446 |
| 2022/0136846 A1* | 5/2022 | Bhorkar | H04W 8/20 |
| | | | 701/411 |
| 2022/0255773 A1* | 8/2022 | Ritchie | |

* cited by examiner

*Primary Examiner* — Ricky Q Ngo
*Assistant Examiner* — Kabir U Jahangir
(74) *Attorney, Agent, or Firm* — Gary L. Eastman, Esq.; Eastman IP (57) ABSTRACT

A method to improve network performance is disclosed. A preferred embodiment of the method involves active data management across multiple connections running processes that enable cohesive, robust and secure data communications across these multiple connections. This active data management method creates a meta network (network about a network) that significantly increases the quality and reliability of the overall communications network and can be applied with or without requiring full custody across the complete connection.

20 Claims, 6 Drawing Sheets

METHOD TO IMPROVE PERFORMANCE OF A WIRELESS DATA CONNECTION

RELATED APPLICATION

This application claims priority to U.S. Provisional Patent Application Ser. No. 63/136,032 for a "Method to improve performance of a wireless data connection," filed Jan. 11, 2021, and currently co-pending, the entirety of which is incorporated herein by reference.

FIELD OF THE INVENTION

The present invention pertains generally to transmission of data. The invention is particularly, but not exclusively, useful as a system and method for improving the reliability and throughput of wired and wireless data transfer in conditions of poor signal quality.

BACKGROUND OF THE INVENTION

As the current utilization of the public Internet evolves, a number of limitations related to standard networking protocols have come to light. These limitations can be overcome utilizing the available networking standards (e.g., TCP/IP) in some cases, but in other cases, the available networking standards create issues, especially in situations where the connection medium is not sufficiently robust (e.g., wireless communications, existing suburban and rural wireline telecommunications networks). As utilization requirements change, in many situations, the existing telecommunications networks are insufficient to provide reliable and secure services, creating significant issues in the areas of performance, management and cybersecurity. In the case of wide-area networks, these problems can be solved using robust software defined networking methods, however, they require a significant amount of computing power at their endpoints, also referred to as nodes (the active components that manage and route telecommunications traffic) and consume a high amount of bandwidth communicating control and management data (the "Control Plane"), which is not an issue for wide area networking, where the bandwidth is sufficient to absorb this overhead. In the case of consumer networks, these methods do not work most of the time because of the lack of expensive equipment at the endpoints combined with the constraint of bandwidth that is typical across the wired and wireless networks in most locales.

With respect to wireless data transmission in general, as the distance increases between two wireless devices, the data performance also decreases due to a number of factors including, but not limited to, decreasing signal strength, radio interference, congestion, data error rates, and data management overhead.

In view of the above, it would be advantageous to provide a method of active data management utilizing extremely efficient meta-networking methods that augments and enable management methods outside the available networking standards including novel methods of introducing efficiency, control and security across any type of telecommunications network.

In the case of wireless connections, it would be further advantageous to provide a method of improving data connectivity that utilizes a number of different methods to improve the quality, speed, and reliability of data transmitted over a wireless connection.

SUMMARY OF THE INVENTION

Embodiments of the disclosed active meta networking system and method can be applied across a number of applications.

In a first exemplary preferred embodiment, as the distance of a wireless connection increases, it is subjected to degradation and the data performance also decreases due to a number of factors including, but not limited to, decreasing signal strength, radio interference, congestion, data error rates and data management overhead. The embodiment utilizes a number of different methods to improve the quality, speed and reliability of data transmitted over a wireless or wired connection solving the aforementioned problem. By controlling one or both ends of a data transmission, various network management methods can be combined to significantly improve the reliability and throughput of data, especially in locations where wireless connection quality varies.

In this application, this embodiment is an improvement on what currently exists based on the methods of connectivity. Current methods of extending the range and quality of wireless connectivity generally utilize antenna technology to increase the range of the device. They do not address the issues introduced by extreme distance, interference or congestion. Without the ability to actively manage the data communication process, these devices cannot overcome the challenges that are introduced by poor connectivity of any kind.

Preferred embodiments of the disclosed method of active data management run processes that enable cohesive data communications across multiple wireless connections at once across multiple wireless terminal devices. This eliminates a single point of failure and allows the processes to manage data across these connections in an orchestrated manner that improves reliability and throughput.

In a second preferred embodiment, when a network is created with multiple remote nodes utilizing consumer wired connections, like that of an employee working from home, the connection quality and security is based on a number of variable factors related to the inherent design of these networks and consumer premises equipment (CPE). As local traffic increases, the network inherently degrades due to congestion. This is because consumer networks are not architected in a manner to deliver consistent quality of service or redundancy. CPE is also subject to potential mismanagement and cybersecurity breaches simply due to their implementation and underlying technology. By implementing edge services on an appropriate CPE connected to a cloud service, it is possible to create multiple paths of communication over both wired and wireless connections, using them in tandem to mitigate the issues discussed above. It is also possible to overcome the cybersecurity issues in remote nodes using the same edge services In this application, this embodiment is an improvement on what currently exists based on the methods of the management of communications. Current methods of managing the quality and security of communications do not address the inherent bandwidth and architectural challenges of most current urban and rural wired and wireless networks. Without the ability to actively manage the data communication process across multiple connections, these CPE cannot overcome the challenges that are introduced when usage exceeds the capabilities of these networks.

The disclosed embodiments of the method of active data monitoring and management running processes allow cohesive data traffic detection and communication management across multiple wired and wireless connections at once. This allows the aforementioned edge service to be directed to route specific data from devices connected to the CPE across different communications networks in a cohesive and seamless fashion to improve the overall quality of the network from the connected device's point of view. It also allows the cloud service to detect anomalous behavior on the CPE to be used to secure potential security breaches on that CPE and command the edge service to interrupt communications, thereby securing the network from a potential intrusion.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION

Figure 1:
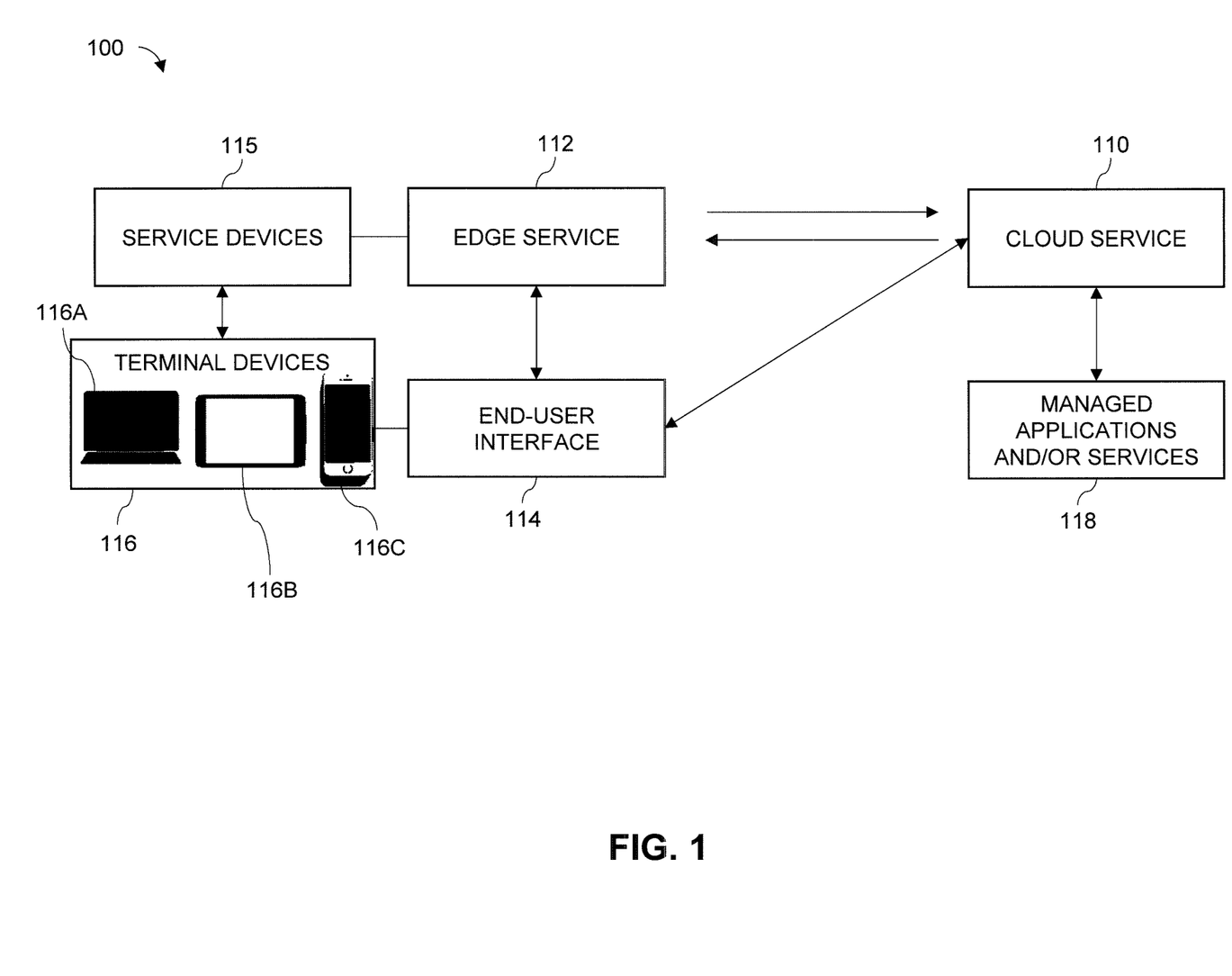
FIG. 1 illustrates components of a preferred embodiment of a management platform operable to improve performance of wireless and wired networks.

Referring initially to FIG. 1, a preferred embodiment of a management platform for improving performance of wireless and wired networks is illustrated and generally designated 100. Platform 100 has three components, including cloud service 110, edge service 112, and end-user interface 114.

Cloud service 110 is the central management and control process combined with methods to optimize data communication with one or more wired and/or wireless terminal devices 116—also referred to herein as user devices—running the edge service 112. For example, terminal devices 166 may include one or more of computer 116A, tablet computing device 116B, and mobile telephone 116C.

Edge service 112 operates on the wired and/or wireless terminal services 116. Edge service 112 is focused on communications, interaction, telemetry, optimization, API management, and wired and/or wireless terminal device 116 management. Edge service 112 is capable of executing across multiple wired and/or wireless devices 115 seamlessly, creating a single virtualized edge service 112 that acts as the remote node end of the data management process. This edge service 112 running across all devices 115 provides, in conjunction with cloud service 110, authentication and security, data management, Internet of Things (IoT) management, and manages application and data service APIs. Because of their close association with edge service 112, devices 115 may be referred to herein as "service devices."

In preferred embodiments, edge service 112 operates a peer-to-peer service managing peer-to-peer connections among service devices 115, illustrated herein in a preferred embodiment as wireless devices, thus creating additional paths of communication and enabling management platform 100 to optimize data transmission across multiple paths of communication, including paths across peer-to-peer links. This allows for more robust communication in many instances: For example, a service device 115 may have an unreliable network connection or lose a wireless signal, but if it maintains one or more peer-to-peer links with other devices 115, terminal devices 116 can still access cloud service 110 and its managed applications and services 118. Moreover, if a service device 115 has a strong signal or high data throughput, but is idle and not actively transferring data, management platform 100 can route the data transfer of a second service device 115 through the idle service device 115 in order to allow second service device 115 to benefit from the strong signal or high throughput of the first service device 115.

End-user interface 114 interacts directly with the user and cloud service 110 to deliver the user access to managed applications and services 118 that are managed by the cloud service 110. Preferred embodiments of end-user interface 114 also act as the individual management interface for the various available applications and services, providing value-added functions such as single sign-on authentication and a consistent user experience.

Preferred embodiments of methods to improve performance of wired and wireless networks utilize all three components, including cloud service 110, edge service 112, and end-user interface 114, in order to fully realize the greatest optimization possible.

Edge service 112 and end-user interface 114 can be combined, but preferred embodiments require physical and logical separation of edge service 112 and cloud service 110 for optimal functioning of a method to improve performance of wired and wireless networks. The separation allows for management of both ends of the data transmission process, as illustrated further in FIG. 3, from end-user interface 114 when it is operating on the Internet or wide area network or is otherwise not able to communicate with edge service 112 directly. Even when only one end of the data transmission process is managed, as illustrated in FIG. 4, a separation is preferable between edge service 112, which runs across service devices 115 in preferred embodiments and on a local network to devices 115 in alternate preferred embodiments, from cloud service 110 which runs on the Internet or wide area network across which data is being transmitted. Furthermore, separation of edge service 112 from cloud service 110 allows for analytics and data management to be performed on more capable hardware, thus reducing the overall cost of edge service 112. Additional This separation allows for service quality to be monitored and procedures such as data timing and error detection to be used in determining optimal paths for data transfer may also be employed by this separation.

In use, management platform 100 is responsible for controlling all processes related to authentication and security, edge services, data management, data communications, device management, user authorization, applications services, and monitoring. Data management services provided by management platform 100 include management and optimization of all data throughput, communication path management, and quality of service (QoS). Management platform 100 is operable with third-party wired and/or wireless networks for conveying both broadband and data communications.

In a preferred embodiment, devices 115—including wired and/or wireless devices—with optimized antennas, CPU, memory, and additional wired and wireless communications capabilities such as WiFi and Ethernet are used.

Edge service 112 running on one or more service devices 115 manages network protocols and traffic and provides management and telemetry interface services with management platform 100. In some embodiments, the application service managed by cloud service 110 and edge service 112 not only monitors performance and activity of terminal devices 116, but also assigns and manages priority of terminal devices 116, or of applications and services accessed by terminal devices 116, or both. Thus, data traffic determined to be more important can be given priority.

End-user interface 114 provides access to external services communicated across the above-described capabilities.

Preferred embodiments of management platform 100 and method 200 (shown in FIG. 6) are used by an end user as follows: The end user installs a wired and/or wireless service device 115, such as mobile telephone 116C, with the edge service 112 installed at their house or business. Upon powering up the service device 115, the service device 115 connects to the cloud service 110, authenticates, and registers with the cloud service 110. Once connected and registered with cloud service 110, a software download or update places the latest available software on the service device 115. More particularly, once a connection to the cloud service 110 is available and the user registers, the user is prompted to download the software; for example, in a preferred embodiment, a user registering with a mobile telephone 116C is provided with a link to download or update the software via an app store. In other cases, the software may be obtained by download or other means at any point prior to powering up device 115. Once this software is installed on service device 115, the user is able to manage the access for end-user terminal devices 116 (e.g., laptops, tablets, mobiles, peripherals) with the service device 115 including all networks and applications that they are authorized to access. More service devices 115 may be then registered using the same process to form a single, cohesive, multipath, fault tolerant edge service 112. Once this is completed, the edge service 112 and cloud service 110 are ready to perform the optimization methods and processes to deliver an excellent user experience to the end-user on all terminal devices 116. All control and interface with the end user are facilitated through this software.

Figure 2:
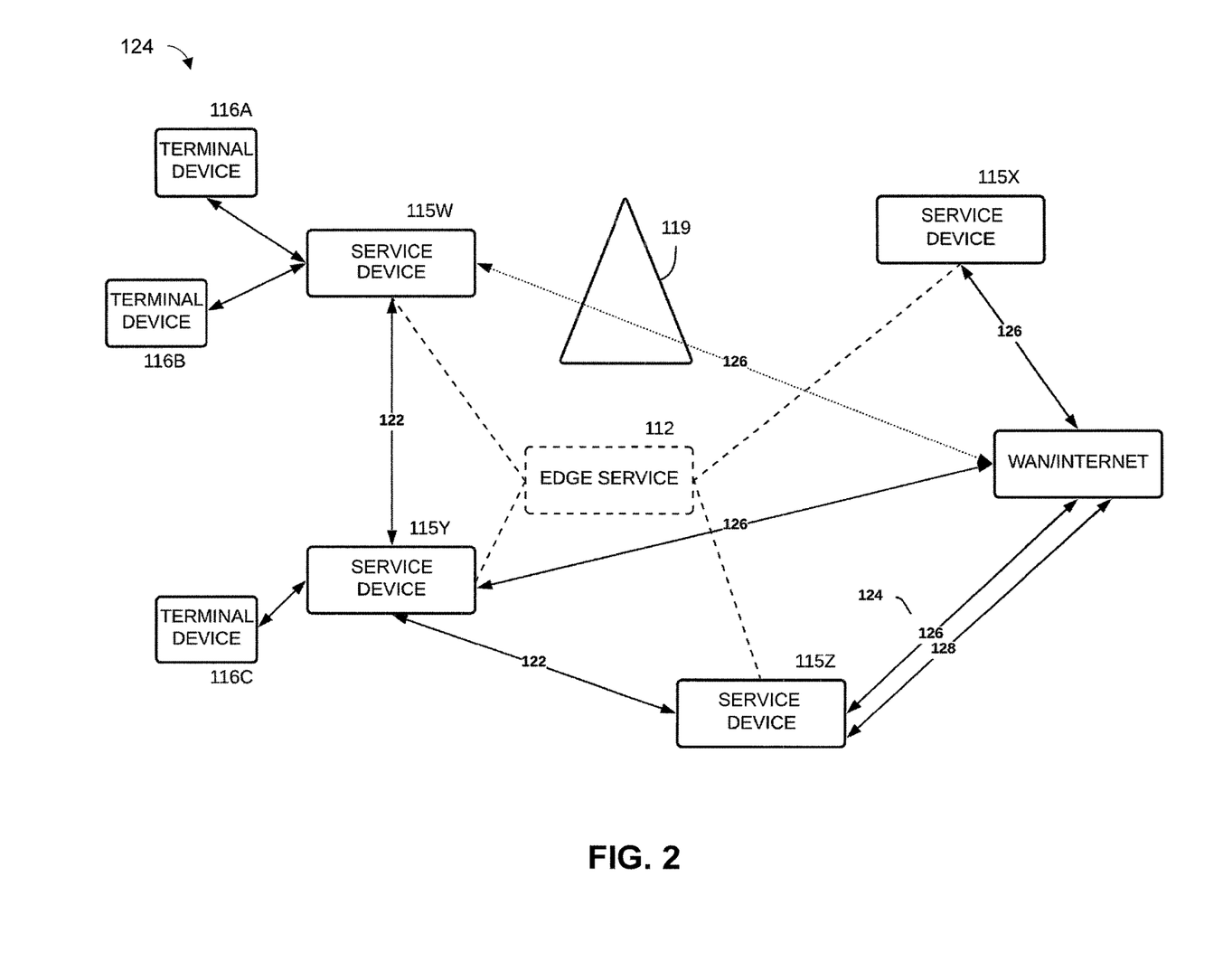
FIG. 2 illustrates the creation of peer-to-peer networks to create additional communication paths for devices on a network.

Referring now to FIG. 2, in a preferred embodiment of management platform 100, edge service 112 creates additional network paths in order to allow for improvement of network performance in cases in which all existing data paths for some devices 116 are suboptimal. Service devices 115 are illustrated herein in a preferred embodiment of wireless devices, but alternative embodiments in the form of wired service devices are fully contemplated. Moreover, a single service device 115 can have both wired and wireless networking capabilities, as illustrated by device 115Z. It is fully contemplated that embodiments of platform 100 and method 200 (shown in FIG. 6) can use any combination of types of service devices 115.

Figure 3:
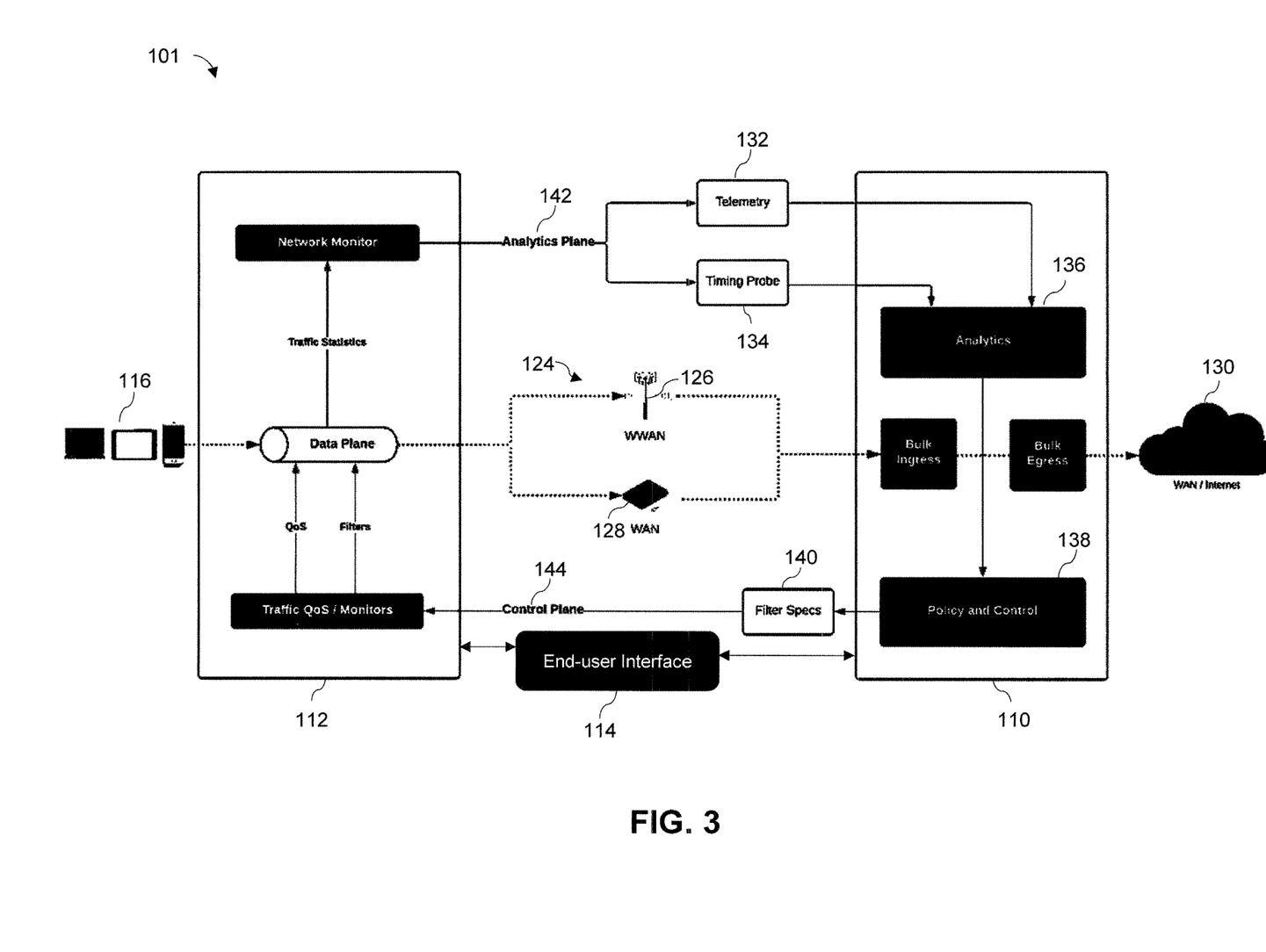
FIG. 3 illustrates the use of the platform of FIG. 1 to actively manage both ends of a data transmission process maintaining full custody of the data before transmission over the Internet.
Figure 4:
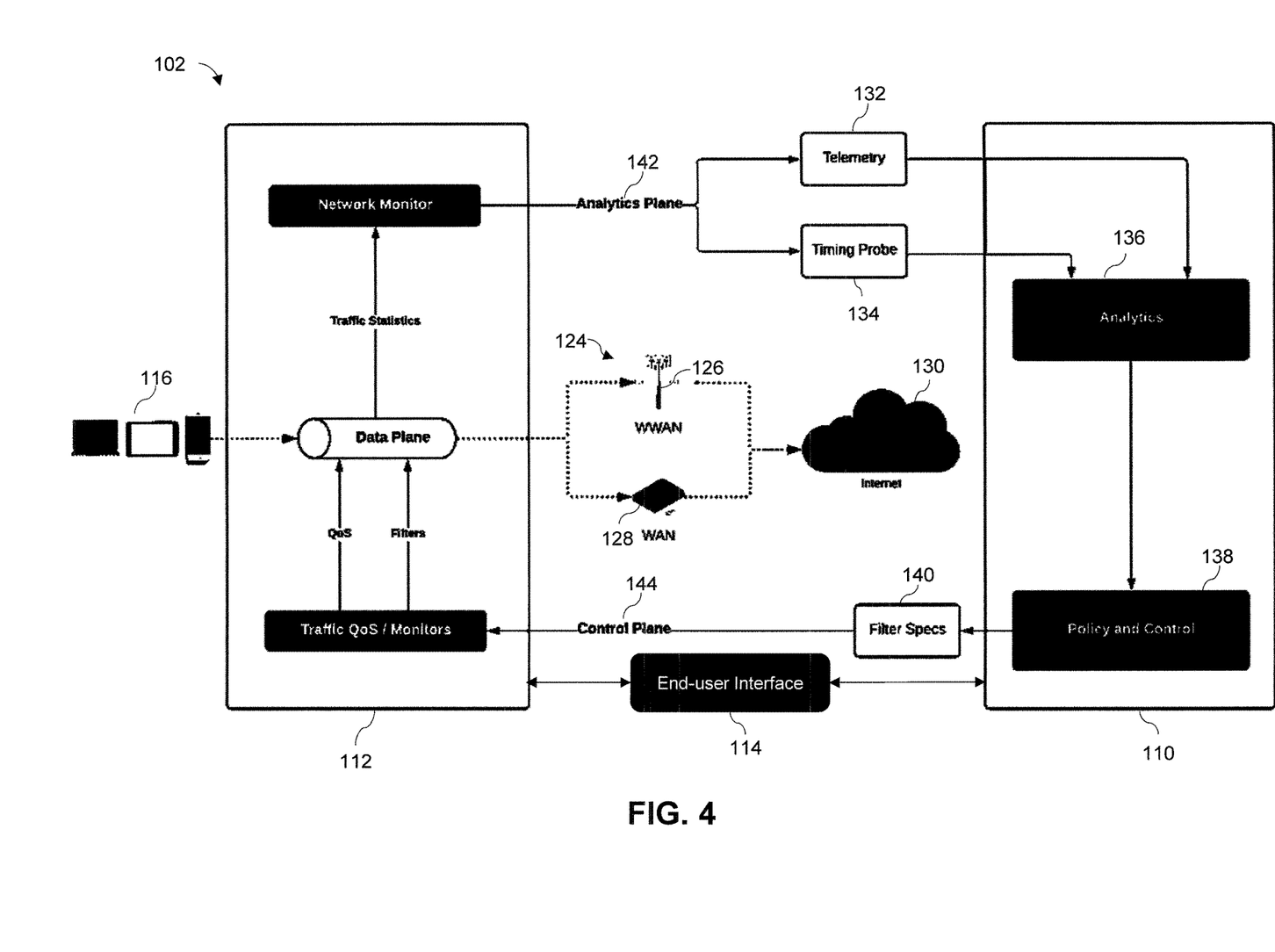
FIG. 4 illustrates the use of the platform of FIG. 1 to actively manage one end of a data transmission process before transmission over the Internet.

Service devices 115, illustrated as wireless devices 115W, 115X, 115Y, and 115Z each have a communication path, illustrated here as a wireless communication path 126, across network 124 to a Wide Area Network 130, which in the most common use case will be the Internet; in some preferred embodiments, the connection at the Internet 130 end will be to cloud service 110 in particular, as illustrated in FIG. 3. In exemplary cases, the communication path across network 124 involves a connection to a switch, router, wireless router, mobile tower, repeater, or other wired or wireless networking apparatus. Moreover, some service devices 115 may have multiple communication paths 126 or 128 (illustrated in FIGS. 4 and 5), such as a computer with both a wired and wireless connection, or a tablet or mobile phone with both WiFi and mobile phone—e.g. Long-Term Evolution (LTE) or other mobile telecommunications standard—service.

In some cases, a communication path may be obstructed or disconnected, weakening or entirely disabling communications along network 124. For example, path 126 of 115W is illustrated as a wireless signal by which service device 115W is connected to Internet 130, but which is interfered with by mountain 119. Therefore, service device 115W has a weak or nonexistent signal through which it accesses the Internet 130, as shown by the dotted lines for its communication path 126, causing both speed and reliability problems.

Edge service 112, running on all service devices 115W, 115X, 115Y, and 115Z, has created peer-to-peer connections 122 between service device 115W and service device 115Y, as well as between service device 115Y and service device 115Z. Both service devices 115Y and 115Z have much more reliable communication paths 120 than service device 115W. However, the peer-to-peer connections 122 create two virtual communication paths for service device 115W to access the Internet 130.

More particularly, in addition to its obstructed communication path 126, the peer-to-peer connection 122 from service device 115W to terminal device 115Y allows data to be transferred from service device 115W to service device 115Y, then over to the Internet 130 through the communication path 126 of terminal device 115Y, and from Internet 130 to service device 115W through the same path in reverse; this constitutes one alternate communication path for service device 115W.

Since service device 115Y and service device 115Z have a peer-to-peer connection 122 between them, this provides a second alternate communication path for service device 115W: Data can be transferred from service device 115W to service device 115Y, then from service device 115Y to service device 115Z, and then to the Internet 130. Responses can be sent back from a service on the Internet 130 to service device 115W through the reverse path. Should communication path 126 of service device 115Y become unavailable, both service device 115W and service device 115Y can continue to engage in data transfer through their direct or indirect connections to service device 115Z. As a result, greater resiliency is provided to network 124, providing greater reliability for communications. Moreover, throughput can be improved by transferring data across multiple paths, both direct communication paths across network 124 and the virtual paths created by peer-to-peer connections 122, at the same time. This can be further facilitated by breaking up a message into parts and sending portions of the message across different paths to be reconstructed by cloud service 110, as discussed below in connection with FIG. 3.

Figure 5:
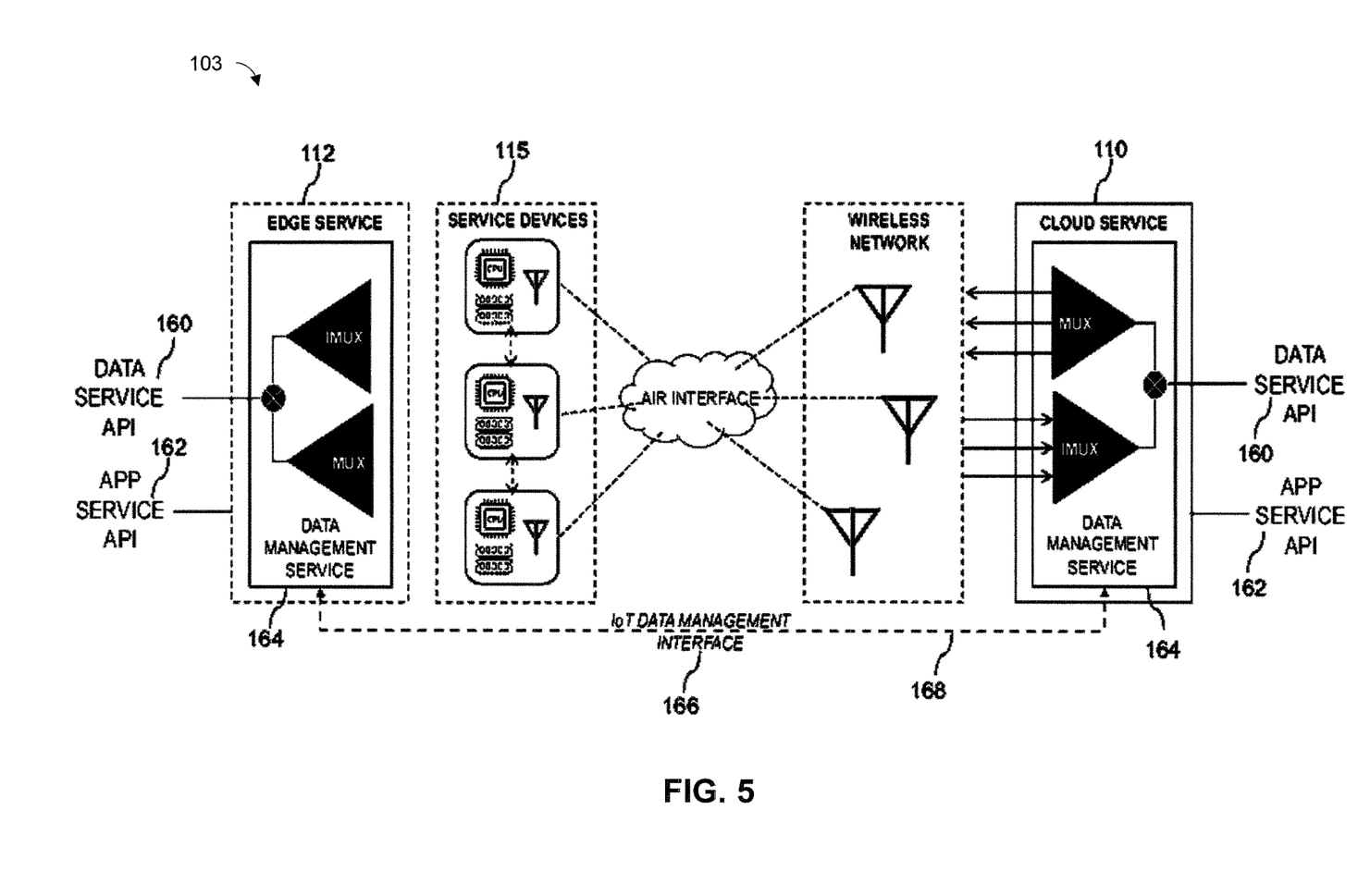
FIG. 5 illustrates the use of components to actively manage both ends of a data transmission process involving a wireless network.

Referring now to FIGS. 3-5, various implementations of management platform 100 for particular use cases are illustrated. Although these particular embodiments are discussed in detail for illustrative purposes, other embodiments involving the various possible combinations of components described below are fully contemplated.

Referring now to FIG. 3, a preferred embodiment of a system for improving performance of wireless and wired networks is illustrated and generally designated 101. System 101 uses management platform 100 (see FIG. 1) to actively manage both ends of the data transmission process between devices 116 and services on the Wide Area Network (WAN) or Internet 130 while maintaining full custody of the data before transmission over the Internet 130.

In use, terminal devices 116 communicate through edge service 112 over network 124 with cloud service 110. Network 124 includes at least a wireless network or communication path 126 or a wired network or communication path 128, and in some embodiments includes more than one, or one or more of each. In this configuration, terminal devices 116 access online applications or services on the Internet 130 through cloud service 110. Therefore, between edge service 112 managing communications at the terminal device 116 end of the data transmission process, and cloud service 110 managing communications at the Internet or WAN 130 end, both ends of the communication process are actively managed.

Edge service 112 monitors performance of each terminal device 116. Telemetry 132 and timing data 134 is provided to cloud service 110 for analytics 136, which involves comparing transfer speed and reliability across communication paths and determining optimal paths for data transfer. Telemetry data 132 may be provided as a single, combined, view of all terminal device data 116 across networks 124. Preferred embodiments separate telemetry data 132 into groups using filters defined by cloud service 110. Such a filter may describe data specific to a particular application or service 118. Preferred embodiments define a set of curated filters that allow analytics 136 to refine the optimization of data flow across networks 124 for each terminal device 116.

Policy and data optimization control 138 is provided by cloud service 110, based on which edge service 112 monitors and controls terminal devices 116. Policy decisions and data flow optimizations 138 are provided as filter specifications 140, which includes directions to edge service 112 to route data transfer through communication paths identified by analytics 136 as optimal for each terminal device 116, as well as instructions for prioritizing access for specific terminal devices 116 or restricting access to certain services for specific terminal devices 116.

Multiplexing and inverse multiplexing technology is used to deconstruct and reconstruct communications messages for delivery across the multiple available data paths across network 124, as is made possible by management of both ends of the data transmission process. This overcomes limitations of existing Internet routers today that prevent terminal devices 116 using multiple paths simultaneously to access the Internet 130. Machine-to-machine data protocols are used to monitor, manage, and optimize the wireless communications of each wired and/or wireless terminal device 116 and the networks 124 or data paths across the networks 124.

Referring now to FIG. 4, a preferred embodiment of a system for improving performance of wireless and wired networks is illustrated and generally designated 102. System 102 uses management platform 100 (see FIG. 1) to actively manage one end of the data transmission process while maintaining full custody of the data before transmission over the Internet 130.

In the illustrated embodiment, edge service 112 manages data transfer between terminal devices 116 across network 124 to the Internet or WAN 130. Although cloud service 110 does not manage the transfer of data between network 124 and a service or application on the Internet 130, it still receives telemetry data 132 and timing data 134 from edge service 112, and provides policy 138 for edge service 112 to implement control over terminal devices 116. This allows for analysis and selection of optimal data paths despite active management of only one end of the data transfer process.

Referring back to FIG. 3, multiplexing technology is used to manage the communications across the multiple available data paths through networks 124. In both FIG. 3 and FIG. 4, machine-to-machine data protocols are used to monitor, manage, and optimize the wireless communications of each wired and/or wireless terminal device 116 and the networks 124. Preferred embodiments use highly efficient, lightweight, and fault tolerant IoT machine-to-machine data protocols for the analytics plane 142 and control plane 144. One such industry standard that may carry both simultaneously is MQTT.

Referring now to FIG. 5, a preferred embodiment of a system for improving performance of wireless and wired networks is illustrated and generally designated 103. System 103 uses management platform 100 (see FIG. 1) to actively manage both ends of the data transmission process over a wireless data connection.

Data service APIs 160 and application service APIs 162 are provided by cloud service 110 and edge service 112 in order to allow effective monitoring and control of terminal devices 116, thus allowing management platform 100 to calculate optimal data transfer paths and manage data distribution across available paths, in view of priority of terminal devices 116, applications, and services, when priorities are assigned, as discussed below. The application service or services support the management of terminal devices 116, while the data management service or services perform the multipath data optimization.

A preferred embodiment of the application service executes across all devices 115, which have independent computer processing capability.

In a preferred embodiment, the application service manages communication and user-based security between the terminal devices 116 and peripheral devices, such as scanners or printers, utilizing the data service. The application service also monitors performance and activity of terminal devices 116, applications and services utilizing the data service. Moreover, in a preferred embodiment, a user of management platform 100 (see FIG. 1) can prioritize data transfer for specific terminal devices 116, applications and services on the Internet 130, or both, so that management platform provides preference to prioritized devices 116 and applications and services in assigning the most efficient communication paths when multiple devices 116 are engaged in data transfer. In accordance with the user-provided settings, the application service assigns and manages priority of terminal devices 116, applications and services utilizing the data service.

The edge service 112 and cloud services 110 managing the data transmission process provide the ability for the Data Service APIs 160 and the Application Service APIs 162 to effectively function across platform 100 (see FIG. 1) and method 200 (See FIG. 6) implemented on platform 100. The methods used to optimize data conductivity between the Cloud Service 110 and the Edge Service 112 utilize existing and novel algorithms to allow the conducting of data across multiple wired and wireless devices 116 to create a fault-tolerant, high-performance connection through the multi-device collaboration of services 164. In a preferred embodiment, such algorithms may be rules-based, goal-based, or a combination of both. Communication between the devices 115 to enable this edge service 112 is via peer-to-peer data communications via wired and/or wireless connectivity between the devices 115, as described above in connection with FIG. 2. These edge services 112 are managed and monitored over a direct data management interface 166 separate from the data conveyance layer 168 (shown in dashed lines) that creates and maintains a connection between the edge service 112 and the cloud service 110, providing a higher level of data visibility and data management capability.

Figure 6:
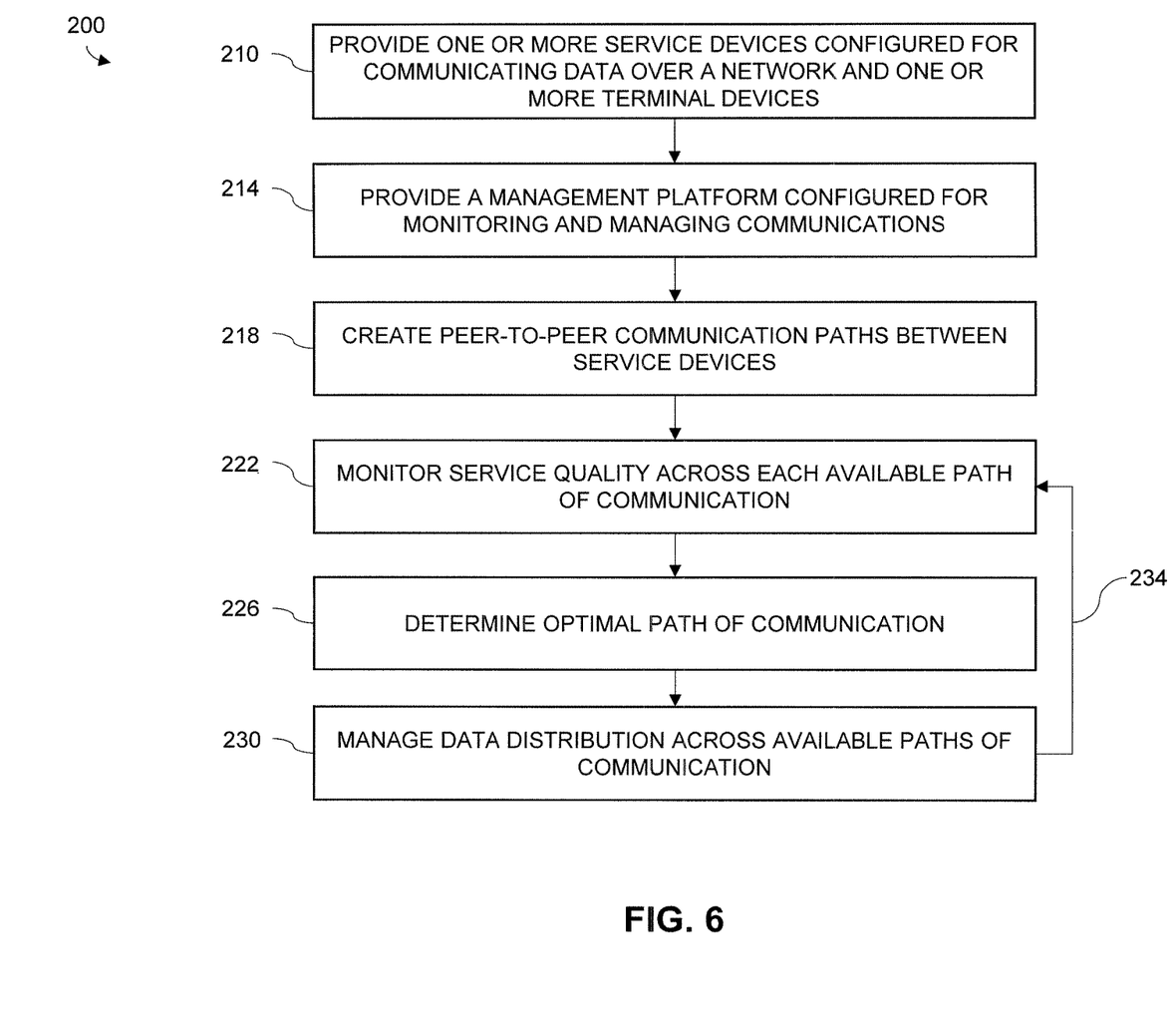
FIG. 6 illustrates a preferred embodiment of a method to improve performance of wireless and wired networks.

Referring now to FIG. 6, a preferred embodiment of a method for improving performance of wireless and wired networks is illustrated and generally designated 200. As illustrated, method 200 begins with step 210 of providing one or more devices 115 (see FIG. 1) configured for communication—data transfer in a preferred embodiment, but it is also contemplated that the method can be applied to other forms of telecommunication, such as digital or analog voice—across a network. In preferred embodiments, the network includes one or more wired networks, or one or more wireless networks, or one or more of each. One or more terminal devices 116 (see FIG. 1) that use devices 115 to access applications or services 118 (see FIG. 1) are also provided.

Step 210 is not limited to a single moment or operation: It is contemplated that in many situations additional devices 115 will at times become available for multi-device collaboration (such as is illustrated in step 218 below, for example), and on occasion a device 115 may become unavailable, for example by signal loss.

Preferred embodiments of method 200 include step 214, which involves providing a management platform 100 (shown in FIG. 1) configured for monitoring and managing communications over the network 124 (shown in FIGS. 2-4). Management platform 100 can be configured according to the embodiments illustrated in FIGS. 2-4, or another embodiment including any combination of features and elements disclosed herein. Portions of some embodiments of management platform 100, such as some embodiments of edge service 112, are installed on devices 115 and act in concert to operate as if a single process across multiple devices 115. In such cases, management platform 100 is capable of being continuously modified in response to changes in network 124, such as the addition of a new device 115 or loss of communication with a device 115. In preferred embodiments, management platform 100 operates to perform the following steps.

When multiple devices 115 are provided, preferred embodiments of method 200 include step 218 of creating peer-to-peer communication paths 122 (shown in FIG. 2) between the available devices 115. As a result of performing step 218, additional communication paths are created beyond the existing (e.g., third party) wired and wireless networks 124 (shown in FIGS. 2-4) across which data transfer is being or planned to be performed. As with step 210, step 218 can be repeated in response to newly available devices 115 or the loss of communication with a device 115.

Step 222 involves the monitoring of service quality across each path of communication. In preferred embodiments, step 222 is performed continuously, or at least repeatedly, in order to respond to changes in service quality across different paths of communication.

In step 226, the optimal path of communication between a terminal device 116 and the wide area network or Internet 130 is determined. In preferred embodiments, step 226 is performed using one or more of data timing, error detection, and active bandwidth detection. An exemplary embodiment treats resolution of this data into routing and prioritization controls as a form of vehicle routing problem and use methods such as shortest-path or quickest-path to optimize traffic over networks 124. Moreover, in preferred embodiments, step 226 is performed for each terminal device as it accesses applications or services 118 (see FIG. 1), and is performed continuously or repeatedly in order to allow step 230 to provide optimal network performance.

In step 230, the results of steps 222 and 226 are used to manage data distribution in the most efficient manner possible across all available paths of communication. As with the other steps, step 230 is performed continuously or repeatedly, as shown by repeating loop path 234, in order to respond to changing network conditions, allowing for optimum performance, and more particularly, enhanced overall quality, throughput speed, and reliability of data transfer at all times.

While there have been shown what are presently considered to be preferred embodiments of the present invention, it will be apparent to those skilled in the art that various changes and modifications can be made herein without departing from the scope and spirit of the invention.

What is claimed is:

1. A system for improving network performance, comprising:
a management platform comprising a cloud service and an edge service;
one or more service devices operating the edge service; and
one or more user devices configured for accessing online applications and services through the one or more service devices,
wherein the edge service comprises traffic and network monitors configured to provide telemetry and timing data to the cloud service, and the cloud service uses the telemetry and timing data to determine optimal paths and method of transmission across the Internet through the one or more service devices and provide policy to the one or more service devices, thereby causing the one or more service devices to utilize all available paths of communication between the one or more service devices to optimize data throughput and quality; and
responding to a network disruption affecting a first service device of the plurality of service devices by transferring data between the first service device and a second service device of the plurality of service devices, the second service device being unaffected by the network disruption.

2. The system for improving network performance as recited in claim 1, wherein the one or more service devices comprises at least two user devices.

3. The system for improving network performance as recited in claim 2, wherein peer-to-peer data communications are utilized between the service devices in order to create additional data transmission paths.

4. The system for improving network performance as recited in claim 2, wherein the edge service comprises shared computing service created across the service devices to manage the optimal paths of data.

5. The system for improving network performance as recited in claim 1, further comprising an application service configured to support the management of the one or more user devices.

6. The system for improving network performance as recited in claim 5, further comprising a data service, wherein the application service manages the communication between the one or more user devices and peripheral devices configured to utilize the data service.

7. The system for improving network performance as recited in claim 5, wherein the application service is configured to manage user-based security between the one or more user devices.

8. The system for improving network performance as recited in claim 5, wherein the application service is configured to monitor performance and activity of the one or more user devices.

9. The system for improving network performance as recited in claim 5, wherein the application service is configured to assign and manage priority of the one or more user devices.

10. A method for improving network performance, comprising the steps of:
providing a plurality of service devices configured for communicating data over a network;
providing a cloud service configured to manage and direct the plurality of service devices;
providing one or more terminal devices configured for accessing applications and services over a network using the plurality of service devices;
sending telemetry and timing data from the plurality of service devices to the cloud service;
determining, using the telemetry and timing data from the plurality of service devices, the optimal path of communication across the Internet through a service device of the plurality of service devices for each of the one or more terminal devices;
establishing policy for the plurality of service devices, causing the one or more service devices to use the optimal path of communication for each of the one or more terminal devices; and
responding to a network disruption affecting a first service device of the plurality of service devices by transferring data between the first service device and a second service device of the plurality of service devices, the second service device being unaffected by the network disruption.

11. The method for improving network performance as recited in claim 10, further comprising the step of providing a management platform configured for monitoring and managing communications, wherein the management platform performs the steps of monitoring service quality, determining the optimal path of communication, and managing data distribution across the available paths of communication.

12. The method for improving network performance as recited in claim 10, wherein the one or more service devices comprise at least two service devices.

13. The method for improving network performance as recited in claim 12, further comprising the step of creating peer-to-peer communication paths between the service devices in order to provide additional communication paths for the steps of monitoring service quality, determining the optimal path of communication, and managing data distribution across the available paths of communication.

14. The method for improving network performance as recited in claim 12, further comprising the step of creating a shared computing service across the at least two service devices that manages optimal paths of data.

15. The method for improving network performance as recited in claim 12, wherein the steps of monitoring service quality, determining the optimal path of communication, and managing data distribution across the available paths of communication use machine-to-machine data protocols to monitor, manage, and optimize multipath communications with the terminal devices.

16. The method for improving network performance as recited in claim 10, wherein the step of managing data distribution across available paths of communication comprises the use of multiplexing to manage communication across multiple paths.

17. The method for improving network performance as recited in claim 10, wherein the steps of monitoring service quality, determining the optimal path of communication, and managing data distribution across the available paths of communication use machine-to-machine data protocols to monitor, manage, and optimize multipath communications between the one or more terminal devices and the network.

18. The method for improving network performance as recited in claim 10, wherein the network comprises a wired network and one or more wireless networks.

19. The method for improving network performance as recited in claim 10, wherein the step of determining the optimal path of communication is performed using data timing and error detection.

20. The method for improving network performance as recited in claim 10, wherein the step of determining the optimal path of communication is performed using active bandwidth detection.

* * * * *